US009096769B2

(12) United States Patent
Sexton

(10) Patent No.: US 9,096,769 B2
(45) Date of Patent: *Aug. 4, 2015

(54) METALLIC INK COMPOSITION AND WRITING INSTRUMENT CONTAINING SAME

(71) Applicant: SANFORD, L.P., Oak Brook, IL (US)

(72) Inventor: Martin N. Sexton, Sugar Grove, IL (US)

(73) Assignee: SANFORD, L.P., Downers Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,053

(22) Filed: Nov. 15, 2013

(65) Prior Publication Data

US 2014/0072719 A1    Mar. 13, 2014

Related U.S. Application Data

(63) Continuation of application No. 13/340,500, filed on Dec. 29, 2011, now Pat. No. 8,617,646.

(51) Int. Cl.
| | | |
|---|---|---|
| *B43K 8/06* | (2006.01) | |
| *B05D 5/00* | (2006.01) | |
| *C09D 171/10* | (2006.01) | |
| *C09D 7/12* | (2006.01) | |
| *C09D 11/17* | (2014.01) | |

(52) U.S. Cl.
CPC ........................................ *C09D 11/17* (2013.01)

(58) Field of Classification Search
None
See application file for complete search history.

(56) References Cited

U.S. PATENT DOCUMENTS

| | | | |
|---|---|---|---|
| 4,545,819 A * | 10/1985 | Shioi et al. ................. | 106/31.58 |
| 4,657,591 A | 4/1987 | Shioi et al. | |
| 4,857,624 A | 8/1989 | DeBlasi et al. | |
| 5,474,603 A | 12/1995 | Miyashita et al. | |
| 5,762,694 A | 6/1998 | Yokoi et al. | |
| 5,877,235 A | 3/1999 | Sakuma et al. | |
| 6,063,176 A | 5/2000 | Lyen et al. | |
| 6,083,311 A | 7/2000 | Kanbayashi et al. | |
| 6,099,629 A | 8/2000 | Morita et al. | |
| 6,120,590 A | 9/2000 | Miyamoto et al. | |
| 6,171,381 B1 | 1/2001 | Yoshimura et al. | |
| 6,224,284 B1 | 5/2001 | Sukhna et al. | |
| 6,402,412 B2 | 6/2002 | Sukhna et al. | |
| 6,524,382 B1 | 2/2003 | Bujard et al. | |
| 6,533,857 B1 | 3/2003 | Schmid et al. | |
| 6,544,323 B2 | 4/2003 | An et al. | |
| 6,561,713 B2 | 5/2003 | Sukhna et al. | |
| 6,599,353 B2 | 7/2003 | Spencer et al. | |
| 6,616,741 B1 | 9/2003 | Sawa et al. | |
| 6,663,704 B2 | 12/2003 | Spencer et al. | |
| 6,706,103 B2 | 3/2004 | Yoshimura et al. | |
| 6,730,154 B2 | 5/2004 | Inoue et al. | |
| 6,730,717 B2 | 5/2004 | Yoshimura et al. | |
| 6,749,676 B2 | 6/2004 | Spencer et al. | |
| 6,770,689 B1 | 8/2004 | Yoshimura et al. | |
| 7,018,122 B2 | 3/2006 | Kwan et al. | |
| 7,135,507 B2 | 11/2006 | Sexton | |
| 7,297,729 B2 | 11/2007 | Sexton et al. | |
| 7,455,724 B2 | 11/2008 | Kwan et al. | |
| 7,829,630 B2 | 11/2010 | Deshpande et al. | |
| 8,617,646 B2 * | 12/2013 | Sexton ......................... | 427/199 |
| 2001/0003262 A1 | 6/2001 | Yoshimura et al. | |
| 2001/0019682 A1 | 9/2001 | Sukhna et al. | |
| 2002/0007768 A1 | 1/2002 | Yoshimura et al. | |
| 2002/0033116 A1 | 3/2002 | Spencer et al. | |
| 2002/0033117 A1 | 3/2002 | Inoue et al. | |
| 2002/0096083 A1 | 7/2002 | Spencer et al. | |
| 2002/0128350 A1 | 9/2002 | Yoshimura et al. | |
| 2002/0148387 A1 | 10/2002 | An | |
| 2002/0197096 A1 | 12/2002 | Sukhna et al. | |
| 2003/0041776 A1 | 3/2003 | Spencer et al. | |
| 2003/0129015 A1 | 7/2003 | Sexton | |
| 2003/0212179 A1 | 11/2003 | Yadav et al. | |
| 2003/0215281 A1 | 11/2003 | Sexton et al. | |
| 2004/0173121 A1 | 9/2004 | Fukuo et al. | |
| 2005/0148685 A1 | 7/2005 | Yamamoto | |
| 2005/0159505 A1 | 7/2005 | Yoshimura et al. | |
| 2010/0239750 A1 * | 9/2010 | Breton et al. ................. | 427/99.4 |
| 2011/0179971 A1 * | 7/2011 | Proelss et al. .............. | 106/31.65 |

FOREIGN PATENT DOCUMENTS

| | | |
|---|---|---|
| EP | 1095991 A1 | 5/2001 |
| JP | 2001354893 | 12/2001 |
| JP | 2003128974 | 5/2003 |
| JP | 2003221542 | 8/2003 |
| WO | WO-0116236 | 3/2001 |
| WO | WO-03044104 | 5/2003 |
| WO | WO-2010/069823 A1 | 6/2010 |

OTHER PUBLICATIONS

High-Performance Metallics Gold for Printing Inks brochure, Schlenk Metallpulver GMBH & Co. KG (2 pages) (printed Mar. 2006).
P-03 Resin, Terepene Phenolic Resin, Akrochem Corporation (1 page) (publicly available before Dec. 29, 2011).
P-104 Resin Product Sheet, Akrochem Corporation (2 pages) (publicly available before Dec. 29, 2011).
Pentalyn 702-M Rosin Resin Product Data Sheet, Eastman Chemical Co. (1 page) (Sep. 19, 2006).
Pigments for Coatings, World of Metallics, Aluminum & Goldbronze Pigments brochure, Schlenk Metallpulver GMBH & Co. KG (19 pages) (printed Jan. 2010).
Pigments for Printing Inks, World of Metallics Pigments brochure (20 pages) (printed Mar. 2011).
Setaprint™ 1200E Phenolic Modified Rosin Resin product sheet, Lawter Inc. (1 page) (updated Mar. 19, 2012).

(Continued)

*Primary Examiner* — Vu A Nguyen
(74) *Attorney, Agent, or Firm* — Marshall, Gerstein & Borun LLP

(57) ABSTRACT

Metallic ink compositions for use in capillary-action markers are provided. More particularly, a metallic ink composition including an aliphatic solvent, a metallic pigment, and a resin combination including at least a fixing resin and a priming resin is provided.

19 Claims, No Drawings

(56) References Cited

OTHER PUBLICATIONS

Setaprint™ 2404E Phenolic Modified Rosin Resin product sheet, Lawter Inc. (1 page) (updated Mar. 19, 2012).
STAPA 15 VS Aluminum Paste Safety Data Sheet, Eckart America Corporation (9 pages) (printed May 30, 2011).
STAPA 20 Aluminum Paste, Eckart America Corporation (1 page) (publicly available before Dec. 29, 2011).
Styrenated Terpene Resin, Summit Trade (1 page) (publicly available before Dec. 29, 2011).
SYLVARES® TP 105 Product Data Sheet, Arizona Chemical (1 page) (Jul. 2009).
SYLVARES® TP 2019 Product Data Sheet, Arizona Chemical (2 pages) (Jan. 2005).
SYLVARES® TP 2040HME Product Data Sheet, Arizona Chemical (1 page) (Jul. 2009).
SYLVARES® TP 2040LO Product Data Sheet, Arizona Chemical (1 page) (publicly available before Dec. 29, 2011).
SYLVARES® ZT106LT Resin Product Data Sheet, Arizona Chemical (2 pages) (Jan. 2005).
Tamanol 803L, Terpene Phenolic Resin, Multiple Plus Ltd. (1 page) (publicly available before Dec. 29, 2011).
Terlone 303A, Ink Resins, Vehicles and Additives Product Guide, Lawter Inc. (8 pages) (2011).
ZONATAC® NG 98 Product Data Sheet, Arizona Chemical (2 pages) (Jan. 10, 2007).
International Search Report and Written Opinion for corresponding international application No. PCT/US2012/071287, mailing date Apr. 17, 2013.

\* cited by examiner

METALLIC INK COMPOSITION AND WRITING INSTRUMENT CONTAINING SAME

BACKGROUND

1. Field of the Invention

The invention relates generally to metallic ink compositions for use in capillary-action markers. More particularly, the invention relates to a metallic ink composition comprised of an aliphatic solvent, a metallic pigment, and a resin combination including at least a fixing resin and a priming resin.

2. Brief Description of Related Technology

Writing instruments capable of making written markings containing metallic pigments are known. For example, valve-action markers capable of making written markings containing metallic pigments have been developed. Typically, such valve-action markers utilize a spring-loaded nib, which opens a valve to an ink reservoir when depressed (e.g., against a writing surface), thereby allowing the ink to flow from the ink reservoir to the nib.

Valve-action markers require more parts than conventional capillary-action markers, and consequently their manufacture is more complicated and costly. Additionally, valve-action markers are problematic in that the metallic pigments tend to settle to the bottom of the ink reservoir when the valve-action markers are not in use. Therefore, the user typically often has to violently shake the marker prior to using same in order to effect distribution of the metallic pigments throughout the ink composition so as to ensure that the ink composition delivered to the marker nib contains sufficient amounts of metallic pigment to produce the desired visual effect. Moreover, the user typically has no means to verify that the metallic pigment has been adequately distributed throughout the ink composition without writing with the marker because the marker barrel is opaque. The user must also subsequently depress the nib against a writing surface to open the valve to the ink reservoir and allow delivery of the ink composition to the nib as described above. In view of the foregoing, other means of delivering metallic ink compositions are desired.

Conventional capillary-action markers typically contain a fibrous ink reservoir and a nib in fluid communication therewith. Such markers typically include an ink composition having a low viscosity because the adhesive forces (between the ink composition and the channel walls of the reservoir and/or nib) must exceed the cohesive forces of the ink composition to permit movement of the composition by capillary-action. Incorporating metallic pigments (e.g., including various metallic pigments such as aluminum and bronze flakes) into the low viscosity ink compositions used in capillary-action markers is often challenging because such metallic pigments tend to settle out of the ink compositions as set forth above. Even when the metallic pigments are adequately suspended in the ink compositions, the marker's fibers frequently undesirably filter the metallic pigments and become clogged over time. Accordingly, over time, the marker can be rendered incapable of making written markings containing metallic pigments.

U.S. Pat. No. 6,120,590 to Miyamoto discloses a ball point pen containing a water-based, thixotropic gel ink having metallic lustrous color. Such thixotropic gel inks, however, are too viscous to be successfully adapted for use in many writing instruments, including conventional capillary-action markers.

Capillary action markers including inks containing metallic pigments are, however, known in the art. U.S. Pat. No. 7,135,507 to Sexton discloses a capillary action marker containing an ink including an aqueous dispersion of a metallic pigment and a specific hydantoin-formaldehyde co-polymer film-forming resin, optionally together with one or more of a color agent, a pH-adjusting agent, anti-settling agent, or a preservative. Additionally, U.S. Pat. No. 7,297,729 to Sexton discloses a capillary action marker containing an ink including a nitro solvent, a film-forming resin, a pigment or dye, and optionally, a substrate wetting agent. Still further, U.S. Pat. No. 6,402,412 to Sukhna discloses an aqueous ink for a capillary action marker including a permanent water-based binder, a colored pigmented permanent water-based dispersion of sub-micron particle size, an aluminum dispersion of specific particle size, a humectant, a surfactant, an anti-settling additive, a preservative and a pH adjuster. Too frequently, however, capillary action markers containing known ink formulations do not deliver a substantially homogenous ink composition for a reasonable amount of time (much less so over the lifetime of the product) and tend to clog, particularly when commercially available bronze pigments are utilized in the ink formulations. Such problems are believed in part to be attributable to the density, size, morphology, and surface treatment of the metallic pigments often used in writing compositions.

SUMMARY

The invention provides a metallic ink composition comprising an aliphatic solvent, a metallic pigment dispersed in the solvent, a first resin component dissolved in the solvent, and a second resin component dissolved in the solvent, wherein the first resin component is a fixing resin and the second resin component is a priming resin.

In a related aspect, the invention provides a capillary-action marker comprising an ink reservoir and a porous nib in fluid communication with the ink reservoir, the ink reservoir containing a metallic ink composition in accordance with the invention.

In another related aspect, the invention provides a method of delivering a metallic ink composition to a substrate comprising the steps of providing a capillary-action marker comprising an ink reservoir and a porous nib in fluid communication with the ink reservoir, the ink reservoir containing a metallic ink composition in accordance with the invention, and contacting the nib of the capillary-action marker to a substrate surface.

Further aspects of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to specific embodiments described herein.

DETAILED DESCRIPTION

The invention provides a metallic ink composition comprising an aliphatic solvent, a metallic pigment dispersed in the solvent, and a resin combination comprising first and second resin components dissolved in the solvent. The resin combination includes a fixing resin and a priming resin. This resin combination has been demonstrated to be particularly advantageous in facilitating the delivery of a substantially homogeneous ink composition containing a metallic pigment with the end result being that any written markings (made using a writing instrument containing an ink composition according to the invention) generally include a regular/uniform/homogeneous amount of metallic pigment to demonstrate a desired decorative effect throughout the lifetime of the product. Additionally, the metallic ink composition according to the invention is advantageous as demonstrated by accelerated aging testing because the metallic pigments contained therein do not settle so as to clog the nib or the ink reservoir of the capillary-action marker, thereby extending the life of the marker by preventing clogging of the marker. In particular, the metallic ink compositions according to the invention demonstrate unexpectedly advantageous performance when the ink compositions include bronze metallic pigments that create a "gold" decorative effect when applied to a substrate. It is believed that the resin combination according to the invention is particularly useful with substantially planar bronze metallic pigments as disclosed herein because of their density, size, morphology, and surface treatment, but of course, other metallic pigments may also be used.

The invention provides a capillary-action marker comprising an ink reservoir and a porous nib in fluid communication with the ink reservoir, the ink reservoir containing a metallic ink composition comprising an aliphatic hydrocarbon solvent, a metallic pigment dispersed in the solvent, and first and second resin components dissolved in the solvent, wherein the first resin component is a fixing resin and the second resin component is a priming resin.

The invention further provides a method of delivering a metallic ink composition to a substrate, the method comprising: providing a capillary-action marker comprising an ink reservoir and a porous nib in fluid communication with the ink reservoir, the ink reservoir containing a metallic ink composition comprising an aliphatic hydrocarbon solvent, a metallic pigment dispersed in the solvent, and first and second resin components dissolved in the solvent, wherein the first resin component is a fixing resin and the second resin component is a priming resin; and contacting the nib of the capillary-action marker to a substrate surface.

Ranges may be expressed herein as from "about" or "approximately" one particular value and/or to "about" or "approximately" another particular value. When such a range is expressed, another embodiment according to the invention includes from the one particular value and/or to the other particular value. Similarly, when particular values are expressed as approximations, but use of antecedents such as "about," "at least about," or "less than about," it will be understood that the particular value forms another embodiment.

Resins

To provide a metallic ink composition suitable for delivery via a marking instrument (e.g., a capillary-action marker), a combination of a fixing resin and a priming resin preferably is included in the ink composition.

Suitable fixing resins must show adequate solubility in the ink composition solvent(s). The fixing resin predominantly is added because it aids in preventing the settling of metallic particles in the nib, but the fixing resin can also undesirably impede delivery of the pigment when present in certain (relative) amounts, particularly when no priming resin is included in the composition. When a fixing resin is included in a metallic ink composition as substantially the sole resin component and in an amount of about 3 percent by weight (wt %) to about 12 wt %, based on the total weight of the ink composition, it has been found that a clear fluid is ultimately (and thereafter irretrievably) delivered from an unacceptably high proportion of capillary-action markers containing same. Without intending to be bound by theory, it is believed that in such writing instruments the metallic pigment becomes fixed in the fibers of the ink reservoir such that the pigment remains in the ink reservoir. In view of the foregoing, the term fixing resin as used herein refers to a resin which when included in a metallic ink composition as substantially the sole resin component and in an amount of about 3 percent by weight (wt %) to about 12 wt %, based on the total weight of the ink composition, will undesirably impede or even prevent delivery of the metallic pigment from capillary-action markers containing such an ink composition such that a clear writing fluid substantially free of metallic pigment is delivered from the capillary-action markers at some point over their lifetime at an unacceptably high proportion of the capillary-action markers, for example, greater than about 50%, greater than about 60%, greater than about 70%, greater than about 80%, and/or greater than about 90%. The ink composition containing the fixing resin as substantially the sole resin component is of course otherwise in accordance with the invention.

The fixing resin preferably is included in a metallic ink composition in accordance with the invention in a range of about 0.5 wt % to about 8 wt %, about 1 wt % to about 6 wt %, about 1.5 wt % to about 5 wt %, about 2 wt % to about 4 wt %, and/or about 2 wt % to about 3.5 wt %, for example, about 3 wt. %, based on the total weight of the ink composition. Again, the fixing resin must be combined with a priming resin to provide an ink composition according to the invention.

In one preferred embodiment, the fixing resin is a styrenated terpene resin. As used herein the term "styrenated terpene resin" includes any resin produced from the copolymerization of one or more terpene hydrocarbon monomers and styrene. Exemplary terpene hydrocarbon monomers include but are not limited to δ-2-carene, δ-3-carene, dipentene, limonene, myrcene, β-phellandrene, α-pinene, β-pinene, α-terpinene, γ-terpinene, terpinolene, and combinations thereof.

In another embodiment, the fixing resin is a phenol free rosin resin. As used herein the term "phenol free rosin resin" refers to any rosin resin not modified with phenol. Rosin is the resinous component of the exudate produced by various species of Pine. The primary components of rosin include but are not limited to abietic acid and pimaric acid. Each of these components, whether individually (particularly, abietic acid) or in combination with other Pine exudate components, can be referred to as a rosin (and thus a phenol free rosin resin). Exemplary phenol free rosin resins include but are not limited to (non-modified) rosin, maleic-modified rosin resins, and fumaric-modified resins. Phenol free rosin resins that are soluble in low aliphatic solvents (i.e., low aliphatic soluble phenol free rosin resins) are preferred.

Suitable fixing resins are available from Finjetchemical Industries (Wuzhou, China), Foreverest Resources, Ltd. (China), Lawter Inc. (Chicago, Ill.), Arizona Chemical Company (Jacksonville, Fla.), Summit Trade Pte., Ltd. (Wuzhou, China), Haixier (Xiamen) Chemical Industry Co., Ltd. (Fujian, China), Xinyi Sonyuan Chemical Co., Ltd. (Guangdong, China). Exemplary commercially available fixing resins include but are not limited to FINNOL™ 3400 (Finjetchemical Industries), ECOREZ® 303A (Lawter, Inc.), SYLVARES® ZT105LT (Arizona Chemical Company), SYLVARES® ZT106LT (Arizona Chemical Company), ZONATAC® NG 98 (Arizona Chemical Company), and SUMTAC™ 9500 (Summit Trade Pte., Ltd.). U.S. Pat. No. 7,829,630, which is incorporated by reference herein in its entirety, describes styrenated terpene resins which may be used as fixing resins in the metallic ink compositions according to the invention.

When the priming resin is included in a metallic ink composition according to the invention, the priming resin can unexpectedly and advantageously substantially counteract the negative consequences that can occur when the fixing resin is present as substantially the sole resin component. The priming resin functions to assist in delivery of the metallic pigment as the ink composition of the invention is drawn to the nib via capillary-action and dispensed upon marking (e.g., making a written marking with the ink composition of the invention). Thus, the priming resin is added to promote delivery of the metallic pigment from the capillary-action marker and is surprisingly able to effect such delivery even when a fixing resin is also included in the ink composition to provide an ink composition in accordance with the invention. When the priming resin is included in a metallic ink composition as substantially the sole resin component and in an amount of about 6 wt % to about 18 wt %, good delivery of the metallic pigment from the capillary-action markers predominantly occurs but inexplicably starving such that the porous nib becomes undesirably clogged and the capillary-action markers fail to deliver any fluid at all from the nib has been observed to occur in an unacceptably high proportion of capillary-action markers containing same. While not intending to be bound by theory, it is believed that in such writing instruments the metallic pigment becomes overprimed with the result being the capillary channels of the nib become clogged, thereby causing starving the marker. The results of this phenomenon can be readily detected by the consumer because of the scratchy (relatively higher friction) writing performance that occurs because no fluid is delivered from the nib to wet the substrate when a written mark is attempted. In view of the foregoing, the term priming resin as used herein refers to a resin which when included in a metallic ink composition as substantially the sole resin component and in an amount of about 6 wt % to about 18 wt % will result in starving such that substantially no fluid is delivered from the capillary-action markers at some point over their lifetime at an unacceptably high proportion of the capillary-action markers, for example, greater than about 40%, greater than about 50%, greater than about 60%, greater than about 65%, and/or greater than about 70%. The ink composition containing the priming resin as substantially the sole resin component is of course otherwise in accordance with the invention.

In the metallic ink compositions according to the invention, the priming resin is included in combination with the fixing resin as previously described. Typically, the priming resin is included in an ink in a range of about 5.0 wt % to about 14.0 wt %, about 7 wt % to about 12 wt %, and/or about 8 wt % to about 11 wt %, for example, about 9 wt %, based on the total weight of the ink composition.

In one preferred embodiment, the priming resin is a terpene phenolic resin. As used herein the term "terpene phenolic resin" includes any addition product of a substituted or unsubstituted phenol with an unsaturated terpene hydrocarbon. Exemplary unsaturated terpene hydrocarbons include but are not limited to δ-2-carene, δ-3-carene, dipentene, limonene, myrcene, β-phellandrene, α-pinene, β-pinene, α-terpinene, γ-terpinene, terpinolene, and combinations thereof.

In another embodiment, the priming resin is a phenolic modified rosin ester resin. As used herein the term "phenolic modified rosin resin" refers to any rosin resin modified with phenol. As explained above, rosin is the resinous component of the exudate produced by various species of Pine. The primary components of rosin include but are not limited to abietic acid and pimaric acid. Each of these components, whether individually (particularly, abietic acid) or in combination with other Pine exudate components, can be modified with a phenolic component to produce a phenolic-modified rosin resin.

Suitable priming resins must show adequate solubility in the ink composition solvent(s). Suitable priming resins must be soluble in the ink composition solvent(s). Suitable priming resins are available from Finjetchemical Industries (Wuzhou, China), Foreverest Resources, Ltd. (China), Arizona Chemical Company (Jacksonville, Fla.), Eastman Chemical Company (Kingsport, Tenn.), Summit Trade Pte., Ltd. (Wuzhou, China), Haixier (Xiamen) Chemical Industry Co., Ltd. (Fujian, China), Xinyi Sonyuan Chemical Co., Ltd. (Guangdong, China), Multiple Plus Co., Ltd. (Thailand), Technical Industries (Peace Dale, R.I.), Akrochem Corporation (Akron, Ohio), and Lawter Inc. (Chicago, Ill.). Exemplary commercially available priming resins include but are not limited to FINNOL™ 3500 (Finjetchemical Industries), SYLVARES™ TP 105 (Arizona Chemical Company), SYLVARES™ TP 2019 (Arizona Chemical Company), SYLVARES™ TP 115, SYLVARES™ TP 2040 (Arizona Chemical Company), SYLVARES™ TP 2040HME (Arizona Chemical Company), SYLVARES™ TP 2040HM (Arizona Chemical Company), SYLVARES™ TP 7042E (Arizona Chemical Company), SYLVARES™ TP 2040LO (Arizona Chemical Company), SYLVARES™ TP 95 (Arizona Chemical Company), SYLVARES™ TP 300 (Arizona Chemical Company), SYLVARES™ TP 7042 (Arizona Chemical Company), SYLVARES™ TP 96 (Arizona Chemical Company), PENTALYN™ 702-M (Eastman Chemical Company), PENTALYN™ 765-M (Eastman Chemical Company), PENTALYN™ 780-M (Eastman Chemical Company), SUMREZ™ 3600 (Summit Trade Pte., Ltd.), TAMANOL 803L™ (Multiple Plus Co., Ltd.), TAMANOL™ 801 (Multiple Plus Co., Ltd.), Tl-REZ#560 (Technical Industries), P-104 Resin (Akrochem Corporation), P-03 Resin (Akrochem Corporation), SETAPRINT™ 1200-E (Lawter Inc.), SETAPRINT™ 2404-E (Lawter Inc.), and SETAPRINT™ 8785-E (Lawter Inc.).

The combination of fixing and priming resins provides an unexpectedly useful balance of properties to the ink compositions according to the invention by both (i) minimizing settling of metallic pigments in the ink composition (which is particularly advantageous in a writing instrument such as a capillary-action marker) and (ii) promoting regular/uniform/homogeneous delivery of the metallic pigment over the lifetime of the product such that any written markings made with the ink composition include a sufficient amount of metallic pigment to demonstrate a desired decorative effect. The ink composition preferably has a total resin content of about 1 wt % to about 20 wt %, about 8.0 wt % to about 16.0 wt %, and/or more preferably about 10 wt % to about 14 wt %, based on the total weight of the ink composition. Generally, the amount of priming resin included in the ink composition is at least equal to the amount of fixing resin included. More typically, the priming resin to fixing resin weight ratio is at least about 3:2, at least about 2:1, and more preferably the priming resin to fixing resin weight ratio is at least about 3:1 (based on respective wt %'s of the priming and fixing resins). On the other hand, the priming resin to fixing resin weight ratio should generally be less than 10:1, for example 6:1, as larger ratios cease to augment writing instrument performance and can instead cause writing instrument performance to deteriorate due to overpriming.

An ink composition which includes a fixing or priming resin as "substantially the sole resin" as described herein refers to a metallic composition which contains the indicated fixing or priming resin at a certain prescribed amount and includes no additional added resins.

Metallic Pigments

A metallic pigment is included in the metallic ink compositions according to the invention so as to provide a shimmering, sparkle, or glitter effect (i.e., an effect produced by the multi-directional reflection of light). Suitable pigment particles include, but are not limited to, metallic pigments such as copper, zinc, aluminum, bronze, mica, oxides thereof, anodizes thereof, and combinations of any of the forgoing. Suitable metallic pigment particles are available from a number of pigment manufacturers such as, for example, US Aluminum (Flemington, N.J.), Eckart America Corporation (Painesville, Ohio), and Schlenk Metallic Pigments (Ashland, Mass.). The metallic pigment particles are typically initially provided in powder form (rather than as a paste) so as to advantageously increase storage capabilities (by using a relatively non-volatile oil having a relatively higher flash point for pasting the powdered pigment) and to provide greater control over the formulation. Of course, pastes can also be used.

Representative metallic pigments include but are not limited to Aluminum Leafing EM/LS/6500 (Schlenk Metallic Pigments), Aluminum Offset FM/4500 (Schlenk Metallic Pigments), Aluminum Offset FM/6500 (Schlenk Metallic Pigments), Goldbronze Offset 6129 Richgold (Schlenk Metallic Pigments), Goldbronze Offset 6340 Richgold (Schlenk Metallic Pigments), Goldbronze Offset 6229 Richgold (Schlenk Metallic Pigments), Goldbronze Offset 6327 Richgold (Schlenk Metallic Pigments), Goldbronze Offset 6234 Richgold (Schlenk Metallic Pigments), Goldbronze Offset 6129 Richpalegold (Schlenk Metallic Pigments), Goldbronze Offset 6340 Richpalegold (Schlenk Metallic Pigments), Goldbronze Offset 6229 Richpalegold (Schlenk Metallic Pigments), Goldbronze Offset 6327 Richpalegold (Schlenk Metallic Pigments), Goldbronze Offset 6234 Richpalegold (Schlenk Metallic Pigments), Goldbronze Offset 6129 Palegold (Schlenk Metallic Pigments), Goldbronze Offset 6340 Palegold (Schlenk Metallic Pigments), Goldbronze Offset 6229 Palegold (Schlenk Metallic Pigments), Goldbronze Offset 6327 Palegold (Schlenk Metallic Pigments), Goldbronze Offset 6234 Palegold (Schlenk Metallic Pigments), LITHOFLEX® ST 015 Silver (Eckart America Corporation), LITHOFLEX® ST 020 Silver (Eckart America Corporation), LITHOFLEX® XA 40 01 Rich Gold (Eckart America Corporation), LITHOFLEX® XA 40 02 Rich Pale Gold (Eckart America Corporation), and LITHOFLEX® XA 40 03 Pale Gold (Eckart America Corporation). Representative metallic pigment available as pastes include but are not limited to Goldbronze Offset FM/6129 Richgold (Schlenk Metallic Pigments), Goldbronze Offset FM/6340 Richgold (Schlenk Metallic Pigments), Goldbronze Offset FM/6229 Richgold (Schlenk Metallic Pigments), Goldbronze Offset FM/6327 Richgold (Schlenk Metallic Pigments), Goldbronze Offset FM/6234 Richgold (Schlenk Metallic Pigments), Goldbronze Offset FM/6129 Richpalegold (Schlenk Metallic Pigments), Goldbronze Offset FM/6340 Richpalegold (Schlenk Metallic Pigments), Goldbronze Offset FM/6229 Richpalegold (Schlenk Metallic Pigments), Goldbronze Offset FM/6327 Richpalegold (Schlenk Metallic Pigments), Goldbronze Offset FM/6234 Richpalegold (Schlenk Metallic Pigments), Goldbronze Offset FM/6129 Palegold (Schlenk Metallic Pigments), Goldbronze Offset FM/6340 Palegold (Schlenk Metallic Pigments), Goldbronze Offset FM/6229 Palegold (Schlenk Metallic Pigments), Goldbronze Offset FM/6327 Palegold (Schlenk Metallic Pigments), Goldbronze Offset FM/6234 Palegold (Schlenk Metallic Pigments). While the provided examples typically have satisfactory particle diameters for use in capillary-action markers containing a metallic ink composition according to the invention, it should be noted that other metallic pigments can be processed, e.g., wet sieved, to control/reduce their particle sizes in order to further optimize the performance of a capillary-action marker containing same.

In one aspect, bronze metallic pigments comprising copper/zinc alloy are used as the metallic pigment. Of course, other elements such as nickel, lead, manganese, phosphorus, and silicon can also be included in the copper/zinc alloy of the bronze pigments. In bronze metallic pigments comprising copper/zinc alloy without any additional elements, the weight ratio of copper to zinc in the goldbronze metallic pigments can be suitably varied between about 50:50 and about 95:5, between about 55:45 and about 90:10, between about 60:40 and about 80:20, for example, about 70:30. Goldbronze metallic pigments having a weight ratio between about 60:40 and about 80:20, for example, about 70:30, have demonstrated particularly good performance as demonstrated by the examples.

Typically, a metallic pigment is included in the ink composition in an amount of about 5 wt % to about 40 wt %, about 7.5 wt % to about 35 wt %, about 10 wt % to about 30 wt %, and/or about 12.5 wt % to about 25 wt %, based on the total weight of the ink composition. The metallic pigment typically has a density of from about 2.5 grams/cubic centimeter (g/cc) to about 12.5 g/cc, about 4 g/cc to about 11 g/cc, and more typically from about 6 g/cc to about 10 g/cc at 20° C. The surface of the metallic pigment is typically treated with a fatty acid, particularly when the pigments are bronze pigments having a substantially planar morphology. Most often, the surface of the metallic pigment is treated with a long chain (18 to 21 carbons) fatty acid such as stearic acid, oleic acid, and the like.

Preferably, the metallic pigment has a substantially planar morphology. Such substantially planar metallic pigments are often referred to in the industry as being corn flakes, silver dollars, or vacuum metalized pigments. Substantially planar metallic pigments are extremely thin typically having a thickness between about $\frac{1}{5}^{th}$ and about $\frac{1}{250}^{th}$ and/or between about $\frac{1}{10}^{th}$ and about $\frac{1}{100}^{th}$ of the particle diameter. Generally, the substantially planar metallic pigments have an average thickness from about 0.01 microns to about 1 micron, about 0.05 microns to about 0.50 microns, and/or about 0.08 microns to about 0.20 microns. Typically, the substantially planar metallic pigments have an average thickness of less than about 0.50 microns, less than about 0.25 microns, and/or less than about 0.10 microns.

The average dimensions of the pigment particles can be ascertained by performing scanning electron microscopy (SEM). Typically, the pigments have an average diameter of from about 0.5 microns to about 7.5 microns; preferably, the pigments have an average diameter from about 1 microns to about 5 microns; even more preferably, the pigments have an average diameter from about 2 microns to about 4 microns. These sizes are generally preferred in as much as such metallic pigments have been demonstrated to minimize settling in a capillary-action marker system over time, and also have been demonstrated to not clog the nib such that the dispensation of the ink from a capillary-action marker is interrupted.

In general, the largest dimension of the pigment particles is limited by the need for the pigment particles to pass through the capillary channels in the porous nibs and fibrous reservoirs of capillary action markers and by the requirement that the pigment particles from stable suspensions that do not settle over time. The smallest dimension of the pigment particles is generally selected to limit penetration of the particles into the interstices of the intended substrate material as such penetration can diminish the intended decorative effect.

Solvent(s)

The metallic ink composition may be any suitable solvent. Generally, the solvent comprises an organic solvent, for example, one or more organic hydrocarbon solvents. As a result, the solvent generally does not contain substantial amounts of water, e.g., the solvent generally contains less than about 5 wt % water, more preferably less than about 1 wt % water, and even more preferably less than 0.1 wt % water. Additionally, while aromatics may be included, for example to enhance the solubility of selected resin components, the solvent generally does not contain substantial amounts of aromatics, e.g., the solvent generally contains less than about 5 wt % aromatics, more preferably less than about 1 wt % aromatics, and even more preferably less than 0.1 wt % aromatics.

Most typically, the solvent comprises at least one aliphatic hydrocarbon solvent. The aliphatic hydrocarbon solvent(s) generally is present in an amount of about 30 wt % to about 90 wt %, about 40 wt % to about 80 wt %, and/or more preferably about 55 wt % to about 75 wt %, based on the total weight of the ink composition. The aliphatic hydrocarbon solvent generally is a liquid at room temperature, but may include aliphatic hydrocarbons which are solids or semi-solids at room temperature.

Preferably, the aliphatic hydrocarbon solvent includes at least one C5-C15 hydrocarbon and more preferably at least one C6-C12 hydrocarbon. The aliphatic hydrocarbon solvent can be comprised of alkanes. Examples of suitable C5-C15 hydrocarbon alkanes include but are not limited to hexanes, heptanes, octanes, nonanes, decanes, undecanes, dodecanes, and mixtures of the foregoing.

The aliphatic hydrocarbon solvent can be provided as a blend of components, for example, derived from petroleum. In one aspect, the aliphatic hydrocarbon solvent solvent is characterized by a boiling point in the range of about 40° C. to about 300° C. and more preferably from about 80° C. to about 200° C. Exemplary blended solvents include mineral spirits and naphtha solvents. Typically, the solvent has a low aromatic content, e.g., less than 35 wt %, less than 10 wt %, and/or less than 1 wt %, based on the total weight of the hydrocarbon solvent. The solvent preferably has a medium evaporation rate (e.g., similar to butyl acetate) from about 0.5 to about 3 and more preferably from about 0.8 to about 2.0. A preferred aliphatic hydrocarbon solvent is naphtha or low aromatics (e.g., "Rule 66") mineral spirits such as Special Naptholite, available from Citgo Petroleum of Tulsa, Okla., having an evaporation rate of 1 (butyl acetate=1).

The aliphatic hydrocarbon solvent can also include a mineral oil comprising C15-C40 hydrocarbons. Because mineral oils have relatively higher boiling points, particularly relative to the continuous phase of most metallic pigment dispersions, they are particularly useful for pasting the metallic pigments as the obtained pigment dispersion can be stored for extended periods with low risk of ignition because of its relatively increased flash point.

Marker Assemblies

The marker includes an ink reservoir disposed in a housing or barrel. The ink reservoir is in fluid communication with a porous nib. The barrel is typically sealed by a plug, which helps to keep the ink reservoir in place.

Typically, the ink reservoir and the nib are disposed in such a manner relative to each other that the ink composition can be transferred from the ink reservoir to the nib via migration as a result of the ink reservoir being in fluid communication with the nib. The ink composition generally moves by capillary-action within the reservoir, i.e., the ink composition generally moves by capillary-action from the distal end of the reservoir to the reservoir end which is proximate to the nib. Similarly, the ink composition generally moves within the nib by capillary-action, i.e., the ink composition generally moves by capillary-action from the portion of the nib which is proximate to the reservoir to the portion of the nib which is applied to a substrate to make a written mark.

According to a preferred embodiment, the ink reservoir is a wick-type reservoir, and the fibrous nib is in continuous (i.e., permanent) contact therewith. In one embodiment, the coupling zone provides a large surface area for the migration of a metallic ink composition from the reservoir to the nib (relative to the size of the nib). The coupling zone on the is usually at least about the same, at least about 1.5 times greater than, and/or at least about 2 times greater than the corresponding greatest dimension of the nib.

Capillary-action markers useful for delivering ink compositions containing metallic pigment particles comprise ink reservoirs having a relatively open structure. Suitable reservoirs for use in the markers according to the invention preferably have a reservoir fiber density less than about 0.50 g/cc, more preferably less than about 0.25 g/cc and most preferably less than about 0.10 g/cc.

The reservoir fibers can be manufactured from thermoplastic polymers such as, for example, polyesters, nylons, polypropylenes, and mixtures thereof (provided that the fibers are insoluble in the ink composition). The fibers inside the reservoir can be linearly-oriented or entangled. To maintain the integrity of the ink reservoir towards aggressive solvents, the reservoir may be wrapped with a sheet of polypropylene, high density polyethylene, or nylon. The reservoirs can be of any dimensions as long as the dimensions are sufficient for storing a predetermined amount of ink and for permitting the reservoir to fit into the desired marker body or housing.

The nibs should be sufficiently porous to allow the metallic pigment particles to pass freely therethrough. The nib also should prevent ink compositions from leaking when the nib is downwardly disposed. Fibers of the nib should be compatible with (i.e., insoluble in) the ink composition solvent system and capable of retaining the ink composition. Suitable nib fibers can be manufactured from thermoplastic polymers such as, for example, polyesters, polypropylenes, acrylics, nylons, and combinations thereof.

Methods of Preparing and Additives

An ink composition according to the invention can be prepared by standard methods. Generally, a metallic pigment is dispersed in a first solvent or non-volatile oil, the fixing resin and priming resin are dissolved in the solvent (sometimes referred to as a "letdown" solvent), and then the two mixtures are combined and additional letdown solvent can be added to adjust the ink composition viscosity. A capillary-action marker containing the inventive ink composition can also be prepared according to standard processing methods.

The viscosity of the glitter ink compositions at 25° C. is usually less than about 40 centipoises (cps), less than about 25 cps, and/or less than about 10 cps, for example, about 1 cps to about 40 cps, about 1 cps to about 25 cps, about 1 cps to about 10 cps, about 1.5 cps to about 5 cps, for example, about 2 cps. However, the ranges provided above can shift higher or lower, depending on the nature and porosity of the nibs and the fiber density of the ink reservoirs used in the markers according to the disclosure.

The ink may optionally contain other additives such as, for example, surface tension modifier(s), other synergic resin(s), surfactant(s), non-volatile solvent(s), dispersing agent(s), and other additives known in the art. These additives can be added to the ink compositions in an amount such that the overall performance of the ink compositions is not adversely affected in any aspect.

The capillary-action, glitter markers and ink compositions in accordance with the disclosure can be better understood in light of the following examples, which are merely intended to illustrate the markers and ink compositions and are not meant to limit the scope thereof in any way.

EXAMPLES

Example 1

A gold ink was prepared with the ingredients identified below in the amounts shown.

| Component | Function | Composition 1 | Composition 2 |
|---|---|---|---|
| Goldbronze metallic pigment | Metallic effect pigment having a weight ratio of copper to zinc of about 70:30 | 20.23 wt % | 20.40 wt % |
| High boiling aliphatic solvent (white mineral oil) | Solvent for pasting metallic pigment | 3.57 wt % | 3.60 wt % |
| Styrenated terpene resin | Fixing resin | 3.14 wt % | 4.10 wt % |
| Naphtha | Solvent | 9.96 wt % | 13.00 wt % |
| Terpene phenolic resin | Priming resin | 9.40 wt % | 8.30 wt % |
| Naphtha | Solvent | 29.78 wt % | 26.30 wt % |
| Naphtha | Letdown solvent | 24.00 wt % | 24.20 wt % |

The fixing and priming resins were separately dissolved in naptha and the solutions were combined to form a resin mixture. The gold pigment was dispersed in a high boiling aliphatic solvent, added to the resin mixture, and diluted with additional naphtha (referred to as "letdown solvent" above). Mixing was continued until the gold pigment particles were evenly distributed in the mixture.

The ink compositions were loaded into markers equipped with an ink reservoir and a porous nib and were allowed to stabilize overnight. Bright gold traces containing high densities of gold particles were produced when markers containing these ink compositions were used to make written marks on paper. These demonstrated that markers containing ink compositions according to the invention, specifically with priming resin to fixing resin ratios of about 3:1 (Composition 1) and about 2:1 (Composition 2) provide superior uniform delivery of the metallic ink, with no evidence of clogging of the nib.

Comparative Example 2

A gold ink was prepared with the ingredients identified below in the amounts shown.

| Component | Function | Amount |
|---|---|---|
| Goldbronze metallic pigment | Metallic effect pigment having a weight ratio of copper to zinc of about 70:30 | 19.98 wt % |
| High boiling aliphatic solvent (white mineral oil) | Solvent for pasting metallic pigment | 3.53 wt % |
| Styrenated terpene resin | Fixing resin | 12.38 wt % |
| Naphtha | Solvent | 39.22 wt % |
| Naphtha | Letdown solvent | 24.90 wt % |

The procedure of Example 1 was followed, except that no priming resin was used and the fixing resin was used as substantially the sole resin component (in approximately the amount of the total resin included in example 1). When a marker containing this ink composition was used, a faint gold trace was produced with a substantially lower density of gold particles relative to the written markings of Examples 1. In this example, the ink composition containing the fixing resin as substantially the sole resin component resulted in delivery of minimal metallic pigment. The poor performance of this marker shows that including the fixing resin can significantly affect the capability for delivering the metallic pigment particles from the marker, particularly when present the fixing resin is present as substantially the sole resin component.

Comparative Example 3

A gold ink was prepared with the ingredients identified below in the amounts shown.

| Component | Function | Amount |
|---|---|---|
| Goldbronze metallic pigment | Metallic effect pigment having a weight ratio of copper to zinc of about 70:30 | 19.98 wt % |
| High boiling aliphatic solvent (white mineral oil) | Solvent for pasting metallic pigment | 3.53 wt % |
| Terpene phenolic resin | Priming resin | 12.38 wt % |
| Naphtha | Solvent | 39.22 wt % |
| Naphtha | Letdown solvent | 24.90 wt % |

The procedure of Example 1 was followed, except that no fixing resin was used and the priming resin was used as substantially the sole resin component (in approximately the amount of the total resin included in example 1). When a marker containing this ink composition was used, a bright gold trace with a high density of gold particles, of a similar intensity as the trace produced in Example 1, was initially produced when a written mark was made. Over time, written markings quickly became faint with a lower density of gold particles, until no marking was produced (starving occurred). In this example, the metallic pigment particles were initially successfully delivered and dispensed upon marking. However, the metallic particles were not dispensed uniformly and ultimately the nib was clogged presumptively because of overpriming of the nib by the ink composition according to this example. The poor performance of this marker shows that including the priming resin in a marker containing a metallic ink composition can significantly affect the capability for delivering the metallic pigment particles from the marker, particularly when present the priming resin is present as substantially the sole resin component.

Example 4

A gold ink was prepared with the ingredients identified below in the amounts shown.

| Component | Function | Composition 1 | Composition 2 |
|---|---|---|---|
| Goldbronze metallic pigment | Metallic effect pigment having a weight ratio of copper to zinc of about 70:30 | 20.23 wt % | 20.40 wt % |
| High boiling aliphatic solvent (white mineral oil) | Solvent for pasting metallic pigment | 3.57 wt % | 3.60 wt % |
| Styrenated terpene resin | Fixing resin | 3.14 wt % | 4.10 wt % |
| Naphtha | Solvent | 9.96 wt % | 13.00 wt % |
| Terpene phenolic resin | Priming resin | 9.40 wt % | 8.30 wt % |
| Naphtha | Solvent | 29.78 wt % | 26.30 wt % |
| Naphtha | Letdown solvent | 24.00 wt % | 24.20 wt % |

The procedure of Example 1 was followed. When markers containing these ink compositions were used, bright gold traces were produced with similar densities of gold particles as the written markings of Example 1. After 4 weeks of aging at 50° C., bright gold traces were produced with similar densities of gold particles as the initial markings. As in example 1, these markers demonstrate that markers with priming resin to fixing resin ratios of about 3:1 (Composition 1) and about 2:1 (Composition 2) provide enhanced, uniform delivery of the metallic ink, with no evidence of clogging of the nib. This example further demonstrates the long-term viability of the markers when both the fixing resin and priming resin are included in the ink composition.

Comparative Example 5

A gold ink was prepared with the ingredients identified below in the amounts shown.

| Component | Function | Amount |
|---|---|---|
| Goldbronze metallic pigment | Metallic effect pigment having a weight ratio of copper to zinc of about 70:30 | 19.98 wt % |
| High boiling aliphatic Solvent (white mineral oil) | Solvent for pasting metallic pigment | 3.53 wt % |
| Styrenated terpene resin | Fixing resin | 12.95 wt % |
| Naphtha | Solvent | 38.81 wt % |
| Naphtha | Letdown solvent | 24.90 wt % |

The procedure of Comparative Example 2 was followed. When a marker containing this ink composition was used, a faint gold trace was produced with a similar density of gold particles as the written markings of Comparative Example 2. After 4 weeks of aging at 50° C., a gold trace was produced with a similar density of gold particles as the initial marking. This example again demonstrates the poor performance of markers containing an ink composition including the fixing resin as substantially the sole resin component. As in Comparative Example 2, without any priming resin in combination with the fixing resin, the metallic pigment particles were not dispensed from the marker. This example demonstrates that it is necessary to include both a priming resin and fixing resin in order to achieve long-term uniform delivery of the metallic pigment particles.

Comparative Example 6

A gold ink was prepared with the ingredients identified below in the amounts shown.

| Component | Function | Amount |
|---|---|---|
| Goldbronze metallic pigment | Metallic effect pigment having a weight ratio of copper to zinc of about 70:30 | 19.98 wt % |
| High boiling aliphatic Solvent (white mineral oil) | Solvent for pasting metallic pigment | 3.53 wt % |
| Terpene phenolic resin | Priming resin | 12.99 wt % |
| Naphtha | Solvent | 38.94 wt % |
| Naphtha | Letdown solvent | 24.90 wt % |

The procedure of Comparative Example 3 was followed. When a marker containing this ink composition was used, a bright gold trace was produced with a similar density of gold particles as observed in the written markings of Comparative Example 3. After 4 weeks of aging at 50° C., 20% of the markers produced a slightly faint gold trace with a significantly lower density of gold particles than the initial markings, presumptively due to overpriming and subsequent clogging of the nib. This example demonstrates that it is necessary to include both a priming and a fixing resin in order to achieve long-term acceptable delivery of the metallic pigment particles.

Comparative Example 7

A gold ink was prepared with the ingredients identified below in the amounts shown.

| Component | Function | Amount |
|---|---|---|
| Goldbronze metallic pigment | Metallic effect pigment having a weight ratio of copper to zinc of about 70:30 | 19.98 wt % |
| High boiling aliphatic Solvent (white mineral oil) | Solvent for pasting metallic pigment | 3.53 wt % |
| Phenolic modified rosin ester | Resin | 12.97 wt % |
| Naphtha | Solvent | 38.85 wt % |
| Naphtha | Letdown solvent | 24.90 wt % |

The procedure of Comparative Example 3 was followed, except the priming resin was a phenolic modified rosin ester. When a marker containing this ink composition was used, a bright gold trace was produced with a similar density of gold particles compared to the written markings of Comparative Example 3. After 4 weeks of aging at 50° C., the marker became over-primed and produced a slightly faded gold trace with a lower density of gold particles than the initial marking. This example confirms that the clogging behavior of the markers of Comparative Examples 3 and 6 is attributable to not including any fixing resin in combination therewith in the metallic ink composition.

What is claimed:
1. An ink composition comprising:
(a) an organic solvent;
(b) a metallic pigment dispersed in the solvent;
(c) a first resin component dissolved in the solvent; and
(d) a second resin component dissolved in the solvent, wherein the first resin component is a fixing resin and the second resin component is a priming resin, the fixing resin comprises a styrenated terpene resin, and the metallic pigment is present in an amount between about 5 wt % and about 40 wt %, based on the total weight of the ink composition.

2. The ink composition of claim 1, wherein the organic solvent is an aliphatic hydrocarbon solvent.

3. The ink composition of claim 2, wherein the aliphatic hydrocarbon solvent comprises one or more alkane hydrocarbons of length C5-C15.

4. The ink composition of claim 2, wherein the aliphatic hydrocarbon solvent comprises one or more alkane hydrocarbons of length C15-C40.

5. The ink composition of claim 1, wherein the metallic pigment comprises a metallic pigment selected from the group consisting of copper, zinc, aluminum, bronze, mica, oxides thereof, anodizes thereof, and combinations of any of the forgoing.

6. The ink composition of claim 1, wherein the metallic pigment comprises a goldbronze metallic pigment comprising a copper/zinc alloy.

7. The ink composition of claim 6, wherein the goldbronze metallic pigment has a weight ratio of copper to zinc between about 50:50 and about 95:5.

8. The ink composition of claim 1, wherein the metallic pigment has an average density between about 2.5 grams/cubic centimeter (g/cc) to about 12.5 g/cc at 20° C.

9. The ink composition of claim 1, wherein the metallic pigment has a substantially planar morphology.

10. The ink composition of claim 9, wherein the metallic pigment has an average thickness between about 0.01 microns to about 1 micron.

11. The ink composition of claim 1, wherein the metallic pigment has an average diameter between about 0.5 microns and about 7.5 microns.

12. The ink composition of claim 1, wherein the surface of the metallic pigment has been treated with a long chain fatty acid comprising 18 to 21 carbons.

13. The ink composition of claim 1, wherein the ink composition has a total resin content between about 1 wt % and about 20 wt %, based on the total weight of the ink composition.

14. The ink composition of claim 1, wherein the fixing resin is present in an amount between about 0.5 wt % and about 8 wt %, based on the total weight of the ink composition.

15. The ink composition of claim 1, wherein the priming resin comprises a terpene phenolic resin.

16. The ink composition of claim 1, wherein the priming resin is present in an amount between about 5 wt % and about 14.0 wt %, based on the total weight of the ink composition.

17. The ink composition of claim 1, wherein the priming resin to fixing resin ratio is at least about 3:2.

18. A method of delivering an ink composition, comprising:
    providing a capillary-action marker comprised of an ink reservoir and a porous nib, the ink reservoir containing an ink composition; and
    contacting the nib of the capillary-action marker to a substrate surface,
    wherein the ink composition comprises an organic solvent, a metallic pigment dispersed in the solvent, a first resin component dissolved in the solvent, and a second resin component dissolved in the solvent, wherein the first resin component is a fixing resin and the second resin component is a priming resin, the fixing resin comprises a styrenated terpene resin, and wherein the metallic pigment is present in an amount between about 5 wt % and about 40 wt %, based on the total weight of the ink composition.

19. A capillary-action marker comprising an ink reservoir and a porous nib in fluid communication with the ink reservoir, the ink reservoir containing a metallic ink composition comprising an organic solvent, a metallic pigment dispersed in the solvent, a first resin component dissolved in the solvent, and a second resin component dissolved in the solvent, wherein the first resin component is a fixing resin and the second resin component is a priming resin, the fixing resin comprises a styrenated terpene resin, and the metallic pigment is present in an amount between about 5 wt % and about 40 wt %, based on the total weight of the ink composition.

* * * * *